US000001834H

United States Statutory Invention Registration [19]

[11] Reg. Number: H1,834

Wilson et al. [45] Published: Feb. 1, 2000

[54] SUN VISOR ASSEMBLY

[75] Inventors: Douglas J. Wilson, Fort Gratiot; Mark R. Litke, Brighton, both of Mich.

[73] Assignee: Lear-Donnelly Overhead Systems, L.L.C., Southfield, Mich.

[21] Appl. No.: 09/185,686

[22] Filed: Nov. 4, 1998

Related U.S. Application Data

[63] Continuation-in-part of application No. 09/007,436, Jan. 15, 1998.

[51] Int. Cl.[7] ..... B60J 3/00

[52] U.S. Cl. ..... 296/97.11; 296/97.2; 296/97.4

*Primary Examiner*—Harold J. Tudor
*Attorney, Agent, or Firm*—Brooks & Kushman P.C.

[57] ABSTRACT

A sun visor assembly is adapted for attachment in a vehicle having a front windshield and a side door window. The sun visor assembly includes a slide track attachable to the vehicle above the side door window. A slide bracket is slidably disposed within the channel. A sun visor pivotably cooperates with the slide bracket, and is pivotable about an axis. An automatic pivot assembly is operatively connected between the slide track and the sun visor for automatically pivoting the sun visor toward a position in which the sun visor is substantially parallel with the slide track as the slide bracket is moved in a direction away from the front windshield, thereby preventing interference of the sun visor with a vehicle occupant as the sun visor is moved between the front windshield and side door window.

24 Claims, 12 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SUN VISOR ASSEMBLY

RELATED APPLICATION

This application is a continuation-in-part of application Ser. No. 09/007,436, which was filed on Jan. 15, 1998, and is hereby incorporated by reference.

TECHNICAL FIELD

The present invention relates to a sun visor assembly and, more particularly, to a sun visor assembly including an automatic pivot assembly operative to pivot the sun visor away from the vehicle occupant as the sun visor is moved from the front windshield to the side door window.

BACKGROUND OF THE INVENTION

Fixed pivot sun visors are sometimes undesirable in vehicle designs because they may be limited in the amount of front windshield and side door window coverage provided, and they may also interfere with the vehicle occupant's head when pivoted between the front windshield and side door window. Tracked transverse style sun visors have been proposed for use in vehicles to increase the windshield and side door window coverage range of the sun visor assembly, but such designs are also problematic.

Tracked, transverse style sun visors have traditionally been difficult to package in most vehicles. The main reason for this difficulty has been the problem the tracked sun visor has in negotiating the angled turn when in transition from the front header to the side rail, i.e., when turning from a position above the front windshield, across the A-pillar, and along the side door window.

Tracked, transverse style sun visors also have not solved the vehicle occupant head interference problem associated with pivoting sun visors.

Accordingly, it is desirable to provide an improved sun visor assembly which overcomes the above-referenced problem associated with prior art sun visor assemblies.

DISCLOSURE OF THE INVENTION

The present invention overcomes the above-referenced problems associated with prior art sun visor assemblies by providing a sun visor assembly including a slide track which is attached above the vehicle side door window. The slide track does not extend above the front windshield. The assembly includes an automatic pivot assembly operative to automatically pivot the sun visor away from the head of the vehicle occupant as the sun visor is moved from the front windshield to the side door window.

More specifically, the present invention provides a sun visor assembly adapted for attachment in a vehicle having a front windshield and side door window. The sun visor assembly comprises a slide track attachable to the vehicle above the side door window. The slide track includes a channel formed therein, and a slide bracket is slidably disposed within the channel. The sun visor assembly further includes a sun visor which pivotably cooperates with the slide bracket, and is pivotable about an axis. An automatic pivot assembly is operatively connected between the sun visor and the slide track for causing rotation of the sun visor about the axis toward a position in which the sun visor is substantially parallel with the slide track as the slide bracket is moved in a direction away from the front windshield. The automatic pivot assembly may comprise a cam connected to the sun visor and a cam truck, or a multi-component assembly operative to pivot the sun visor. Interference of the sun visor with a vehicle occupant is thereby prevented as the sun visor is moved between the front windshield and side door window.

The slide track is preferably substantially straight and extends only above the vehicle side door window, thereby eliminating the need to negotiate the turn across the A-pillar to the front windshield. The automatic pivot assembly also prevents interference of the pivoting sun visor with the vehicle occupant.

Accordingly, an object of the present invention is to provide a sun visor assembly having a moving pivot point, wherein the sun visor automatically pivots away from the head of a vehicle occupant as the sun visor is moved from the front windshield to the side door window.

A further object of the invention is to provide a sun visor assembly including a guide track which extends only above the side door window of the vehicle, and does not extend above or adjacent the front windshield.

Another object of the invention is to provide a sun visor assembly with a sun visor having a moving pivot point, and including an automatic pivot assembly operative to pivot the sun visor away from the head of a vehicle occupant as the sun visor is moved in a direction away from the front windshield.

The above objects and other objects, features, and advantages of the present invention are readily apparent from the following detailed description of the best mode for carrying out the invention when taken in connection with the accompanying drawings.

DETAILED DESCRIPTION OF THE PREFERRED EMBODIMENTS

Figure 1:
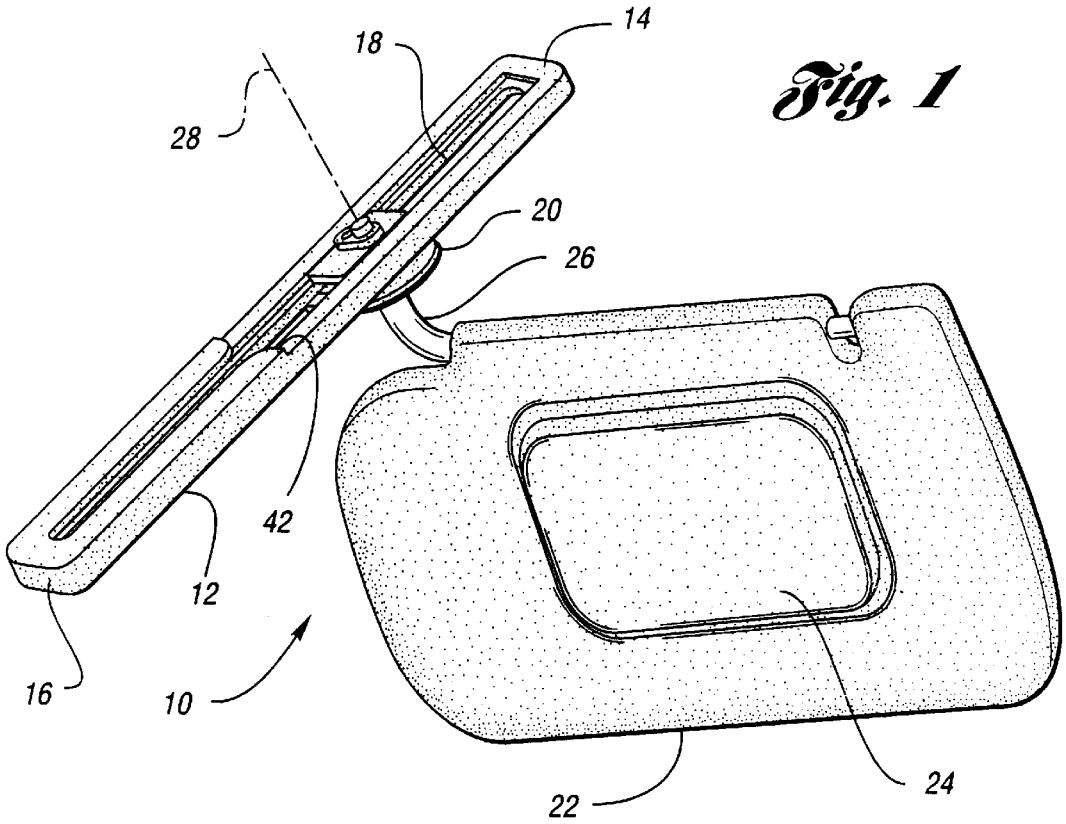
FIG. 1 shows a perspective view of a sun visor assembly in accordance with the invention, with the sun visor in a position substantially perpendicular to the slide track.
Figure 2:
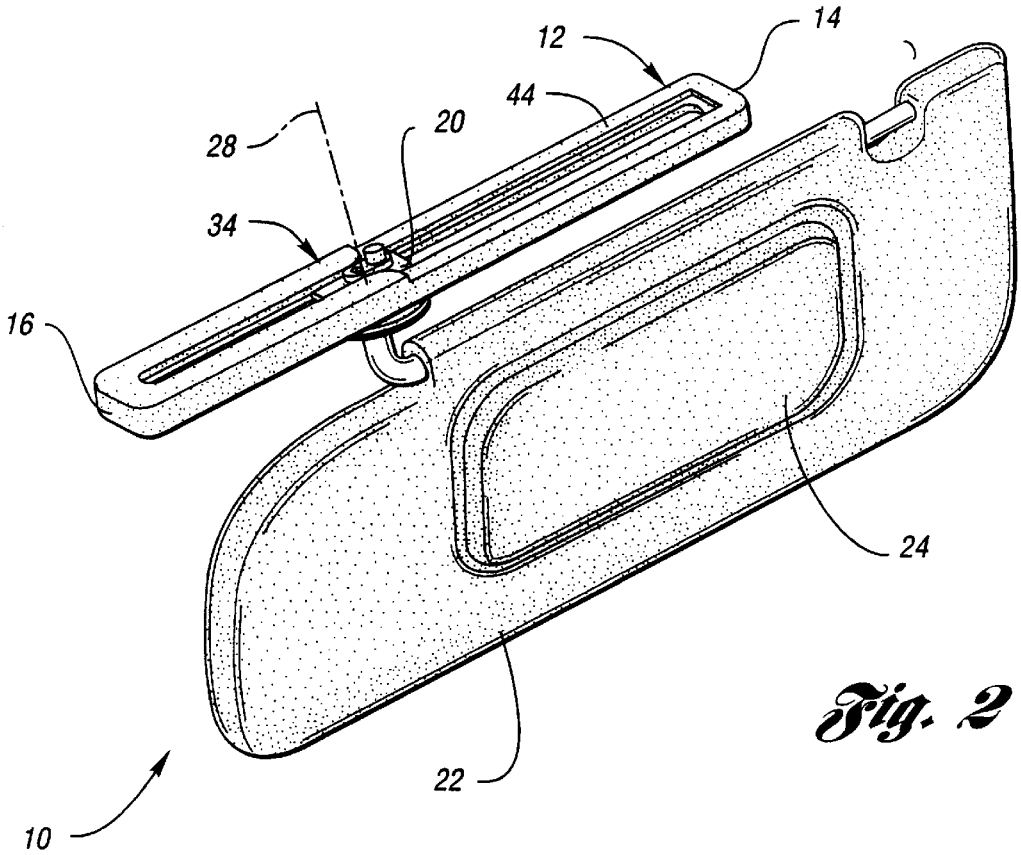
FIG. 2 shows a perspective view of the sun visor assembly of FIG. 1, with the sun visor in a position substantially parallel with the slide track.
Figure 3:
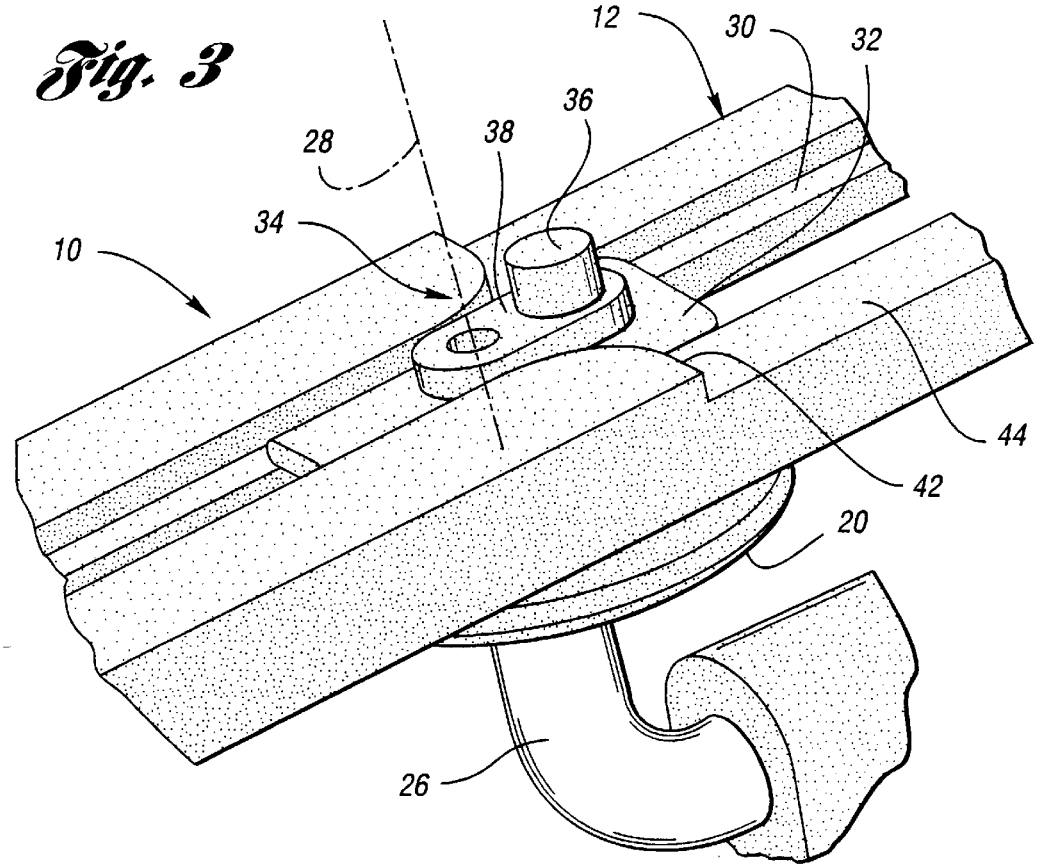
FIG. 3 shows an enlarged perspective view of the automatic pivot assembly in accordance with the embodiment shown in FIG. 1.

Referring to FIGS. 1–3, a preferred embodiment of a sun visor assembly 10 is shown. The sun visor assembly 10 is adapted for attachment in a vehicle having a front windshield and a side door window. The sun visor assembly 10 includes a slide track 12 attachable to the body sheet metal above the side door window.

The slide track 12 has a substantially straight configuration for attachment only above the side door window and not extending above the front windshield of the vehicle, thereby avoiding the need to negotiate the turn at the A-pillar between the side of the vehicle and the front portion above the front windshield. Advantageously, the slide track 12 may be pre-assembled in a vehicle headliner system (not shown), which can later be installed in the vehicle.

The slide track 12 includes a front end 14 which is to be positioned closely adjacent the A-pillar of the vehicle above the side door window. The rear end 16 of the slide track 12 is positioned above the side door window rearward in vehicle from the front end 14 such that the slide track 12 extends lengthwise above the side door window. The slide track 12 includes a channel 18 formed therein along the length of the slide track 12. A slide bracket 20 is slidably connected within the channel 18 for sliding movement between the front end 14 and rear end 16 of the slide track 20.

The sun visor 22, which includes a flip-up mirror 24, is pivotally connected by a support rod 26 to the slide bracket 20. The support rod 26 is pivotable about an axis of rotation 28, which intersects the slide bracket 20.

FIG. 3 shows the attachment between the slide bracket 20 and the slide track 12 in greater detail. As shown, the slide track 12 includes opposing grooves 30 which slidably receive the top plate 32 of the slide bracket 20. An automatic pivot assembly 34 includes a cam member 38 which is connected to the support rod 26 for pivotal movement therewith. Accordingly, pivotal movement of the cam member 38 about the axis of rotation 28 causes pivotal movement of the support rod 26, and of the sun visor 22. The cam member 38 extends over the slide bracket 20 and includes a knob portion 36 which is not functionally necessary in this particular embodiment. The lower portion of the cam member 38 which supports the knob portion 36, is offset from the axis of rotation 28.

The automatic pivot assembly 34 also includes a cam track 42 which is engageable with the cam member 38 for causing rotation of the sun visor 22 about the axis of rotation 28 toward a position in which the sun visor 22 is substantially parallel with the slide track 12, as shown in FIG. 2, as the slide bracket 20 is moved in a direction away from the front windshield of the vehicle, thereby preventing interference of the sun visor 22 with the head of a vehicle occupant as the sun visor 22 is moved between the front windshield and side door window. In this embodiment, the cam track 42 is formed as part of the slide track 12. However, the cam track 42 may be a separate component to facilitate such pivotal movement.

In this embodiment, when the slide bracket 20 is near the front end 14 of the slide track 12, the pivot arm 38 is free to rotate above the top surface 44 of the slide track 12. Accordingly, in this position, the sun visor 22 may be freely pivoted, without restriction, about the axis of rotation 28. As the slide bracket 20 is moved from the front end 14 toward the rear end 16 of the slide track 12, the cam track 42 will engage the cam member 38 to automatically pivot the cam member 38, and hence the support rod 26, about the axis of rotation 28 in a counterclockwise direction, viewed from above, so that the sun visor 22 is pivoted to a position in which the sun visor 22 is substantially parallel with the slide track 12, as shown in FIG. 2, as the slide bracket 20 continues to move toward the rear end 16 of the slide track 12.

Figure 4:
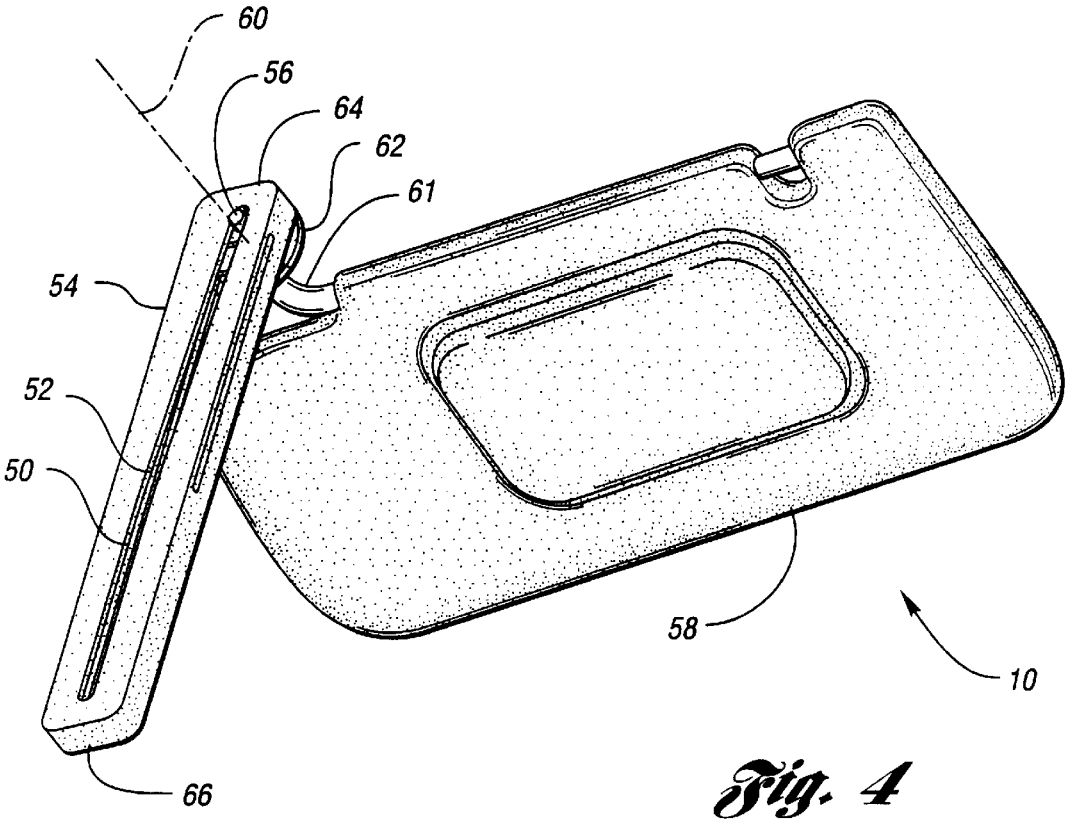
FIG. 4 shows a perspective view of a sun visor assembly in accordance with an alternative embodiment of the invention.

FIG. 4 shows an alternative embodiment 100 of the sun visor assembly. Rather than the upstanding cam track 42, particularly as shown in FIG. 3, the embodiment shown in FIG. 4 provides a continuous cam track 50 which extends the length of the channel 52 of the slide track 54. Accordingly, the knob-type cam member 56, which is connected to the support rod 61, is at all times captured within the cam track 50 so that the sun visor 58 never freely rotates about the pivot axis 60 because the pivotal movement of the support rod 61 is defined by movement of the cam member 56 along the cam track 50 from end to end.

Accordingly, as the slide bracket 62 is slid from the front end 64 of the slide track 54 toward the rear end 66 of the slide track 54, the cam track 50 guides the cam member 56 through its gradual pivotal movement about the pivot axis 60, and causes rotation of the support rod 61 about the pivot axis 60. This end-to-end movement causes the sun visor 58 to move from a position substantially perpendicular with the slide track 54, as shown in FIG. 4, to a position in which the sun visor 58 is substantially parallel with the slide track 54.

Figure 7:
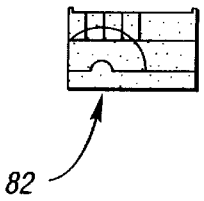
FIG. 7 shows an end view of the track of FIG. 5.
Figure 5:
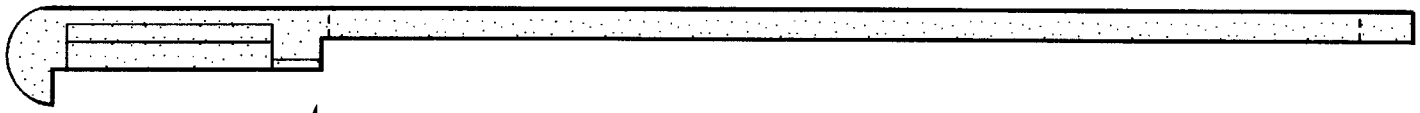
FIG. 5 shows a side view of a top track in accordance with a second alternative embodiment of the invention.
Figure 6:
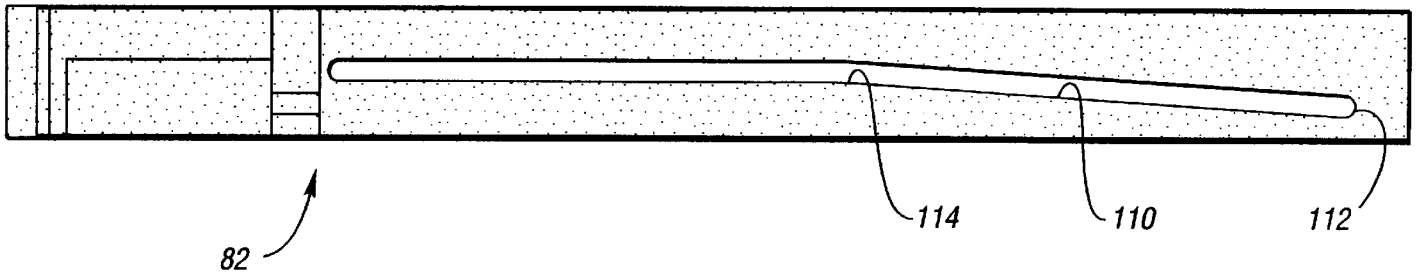
FIG. 6 shows a top view of the track of FIG. 5.
Figure 9:
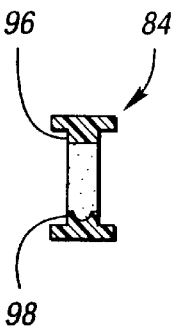
FIG. 9 shows a sectional view taken at line a—a of FIG. 8.
Figure 12:
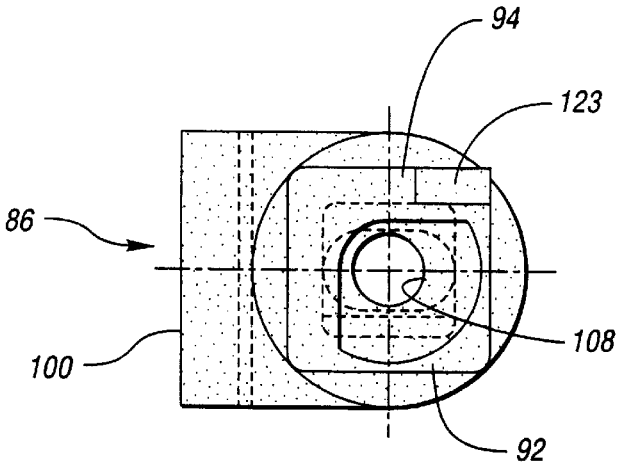
FIG. 12 shows a top view of a slide bracket for use with the embodiment of FIG. 5.
Figure 13:
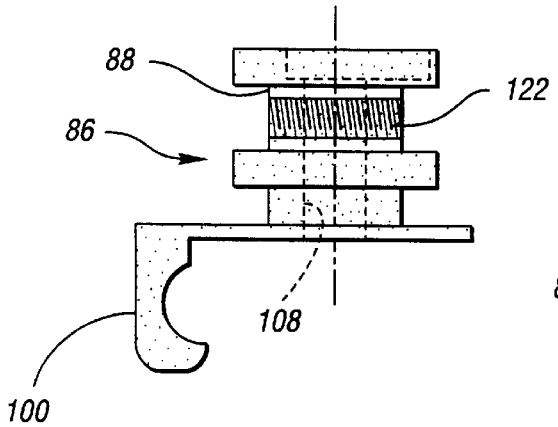
FIG. 13 shows a side view of the slide bracket of FIG. 12.

FIGS. 5–21 show a second alternative embodiment 200 of the invention. This embodiment is functionally very similar to the embodiment of FIG. 4. In this embodiment, the slide track 80 comprises a top track 82, shown in FIGS. 5–7, secured to a bottom track 84, shown in FIGS. 8–11. The attached top track 82 and bottom track 84 combine to form the slide track 80 which receives the slide bracket 86, shown in FIGS. 12–14. The slide bracket 86 includes a base 88 which is slidably received within the channel 90 of the bottom track 84. The upper flanges 92,94 of the slide bracket 86 slide on the ledges 96,98 of the bottom track 84. As shown in FIG. 13, the slide bracket 86 also includes a handle 101 to facilitate manual movement of the slide bracket 86 along the slide track 80 for sun visor adjustment.

Figure 14:
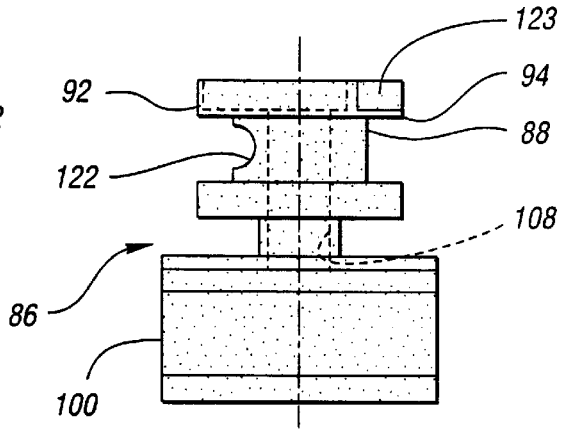
FIG. 14 shows an end view of the slide bracket of FIG. 12.
Figure 15:
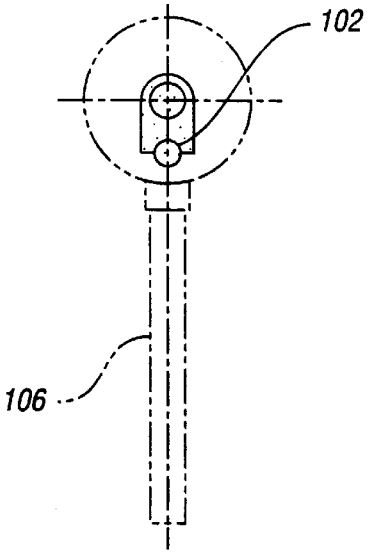
FIG. 15 shows a top view of a cam member and sun visor support rod for use with the embodiment of FIG. 5.
Figure 17:
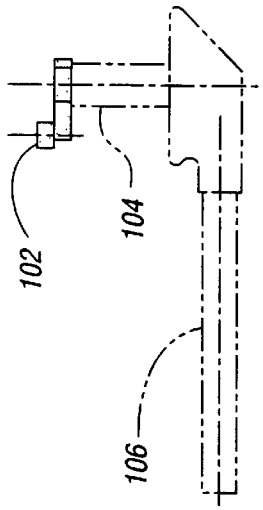
FIG. 17 shows a side view of the cam member and support rod of FIG. 15.
Figure 16:
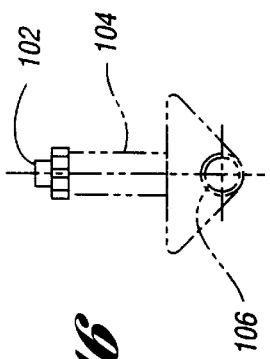
FIG. 16 shows an end view of the cam member and support rod shown in FIG. 15.
Figure 19:
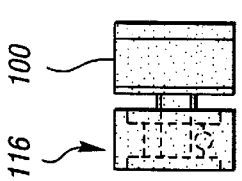
FIG. 19 shows a cross-sectional view of the assembly of FIG. 18.
Figure 18:
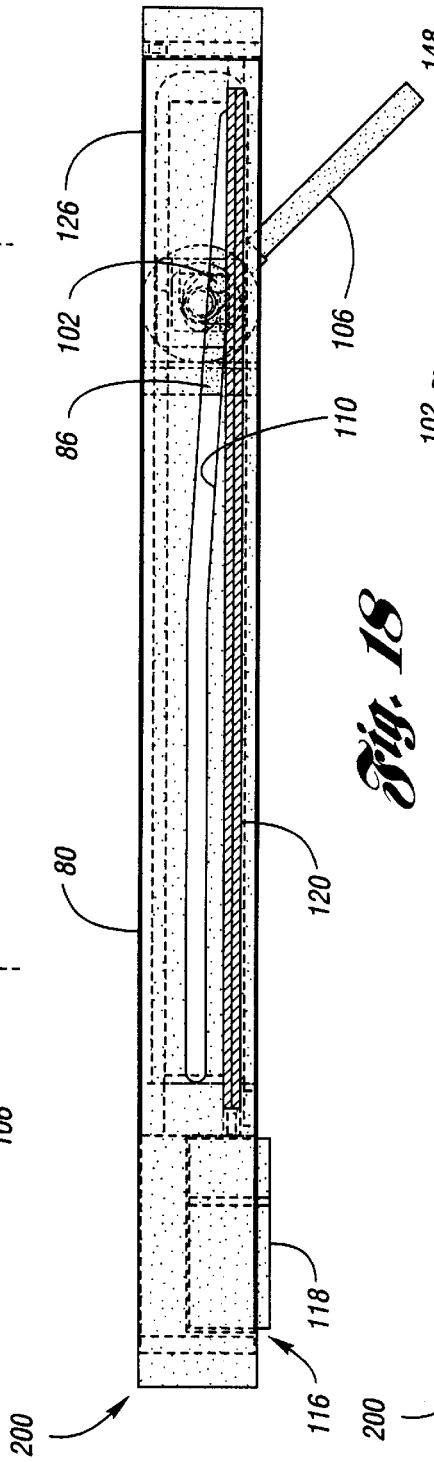
FIG. 18 shows a top plan view of an assembled sun visor track assembly in accordance with the embodiment of FIG. 5.
Figure 21:
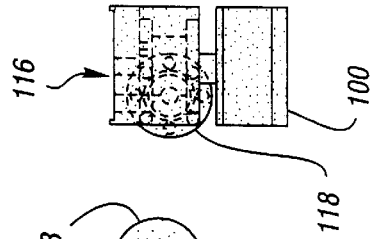
FIG. 21 shows an end view of the assembly of FIG. 18.

Turning to FIGS. 15–17, a cam member 102, pivot shaft 104, and sun visor support rod 106 are shown. The pivot shaft 104 is pivotally received within a central aperture 108 of the slide bracket 86, shown in FIGS. 12–14. Accordingly, the cam member 102, pivot shaft 104, and sun visor support rod 106 are pivotally movable with respect to the slide bracket 86 for sun visor angle adjustment. The pivotal adjustment of the cam member 102, pivot shaft 104, support rod 106 and sun visor is dictated by the movement of the cam member 102 within the cam slot 110 formed within the top track 82, shown in FIG. 6, as the slide bracket 86 is moved longitudinally along the slide track 80.

When the cam member 102 is at the first end 112 of the cam slot 110, the offset relationship of the cam member 102 with respect to the pivot shaft 104 will result in the support rod 106 and sun visor being substantially perpendicular to the slide track 80. As the slide bracket 86 is moved longitudinally along the slide track 80, the cam member 102 moves along the cam slot 110 from the end 112 of the cam slot toward the middle 114 of the cam slot. As this movement occurs, the position of the cam member 102 changes with respect to the axis of rotation of the pivot shaft 104, thereby causing the pivot shaft 104 to rotate counterclockwise, as viewed from the top, thereby pivoting the sun visor toward the slide track 80. Once the cam member 102 has reached the middle portion 114 of the cam slot 110, the support rod 106 and sun visor will be in a position substantially parallel to the slide track 80.

Turning to FIGS. 18–21, fully assembled views of the sun visor track assembly 116 are shown. In order to electrically drive movement of the sun visor assembly, a motor 118 and drive screw 120 are provided. Returning to FIG. 14, the slide bracket 86 is provided with a threaded channel 122 to receive the threaded drive screw 120, shown in FIGS. 18–21, which is rotated by the motor 118 for moving the slide bracket 86 longitudinally along the slide track 80. The motor 118 is connected by wiring to a control switch (not shown) which controls operation of the motor. The control switch may be mounted in the vehicle in any suitable location such as on an arm rest, door panel, floor console, roof console and/or steering wheel. Alternatively, any suitable drive mechanism can be used to electrically drive movement of the sun visor assembly. Such drive mechanisms include a cable drive mechanism, a tape drive mechanism, or a rack and pinion drive mechanism.

Figure 8:
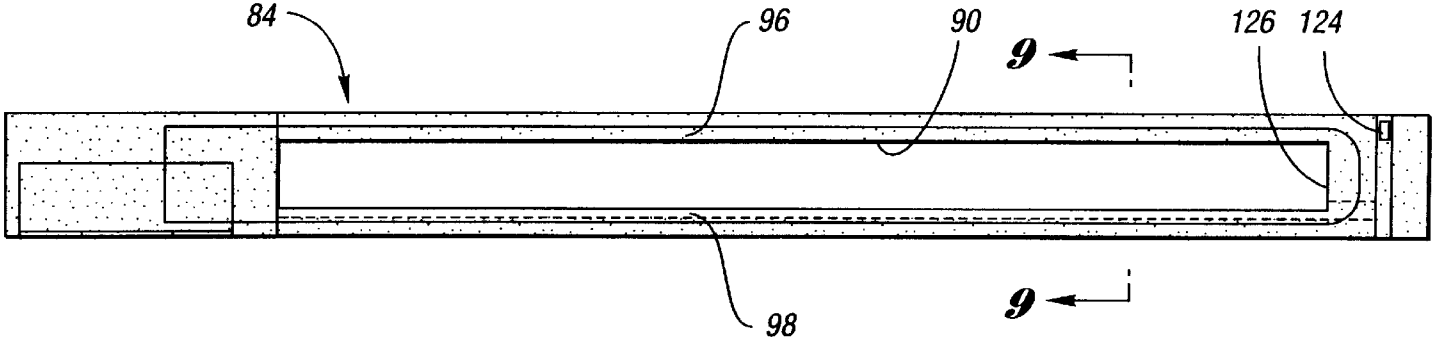
FIG. 8 shows a top view of a bottom track for use with the embodiment of FIG. 5.
Figure 11:
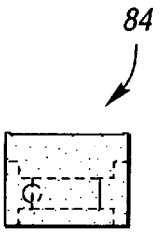
FIG. 11 shows an end view of the track shown in FIG. 8.
Figure 10:
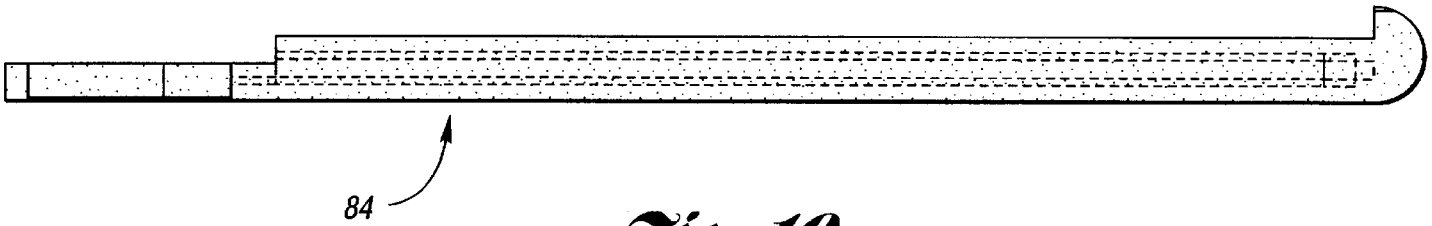
FIG. 10 shows a side view of the bottom track of FIG. 8.

Still referring to FIG. 14, the slide bracket is provided with an electrical connector 123, which is configured to provide electric current to a sun visor vanity mirror or other component. Referring to FIG. 8, the bottom track 84 includes a corresponding electrical connector 124 which mates with the electrical connector 123 on the slide bracket 86 when the slide bracket 86 is moved to the end 126 of the slide track 80. The connectors 123,124 are connected to wiring as needed.

Figure 20:
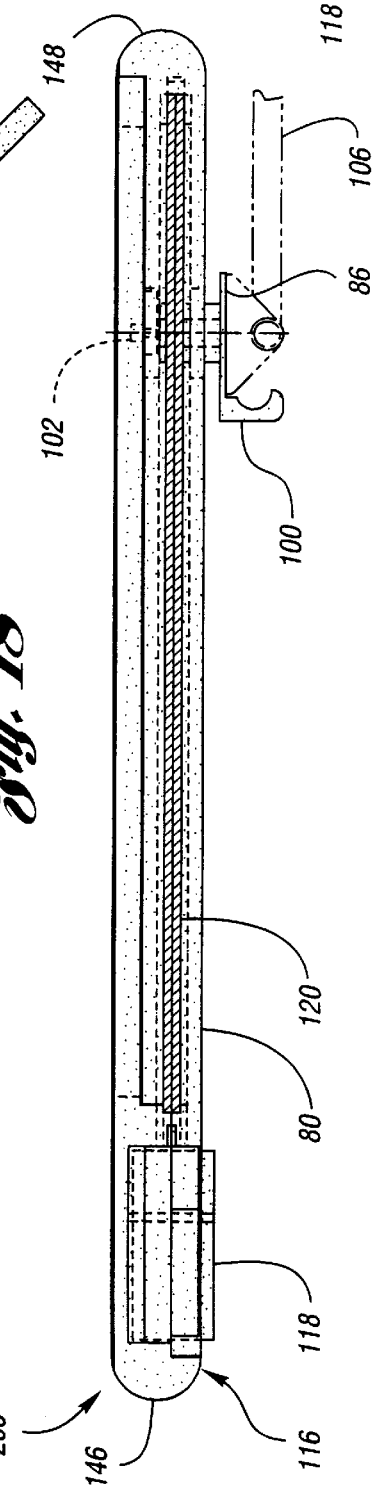
FIG. 20 shows a side view of the assembly of FIG. 18.
Figure 22:
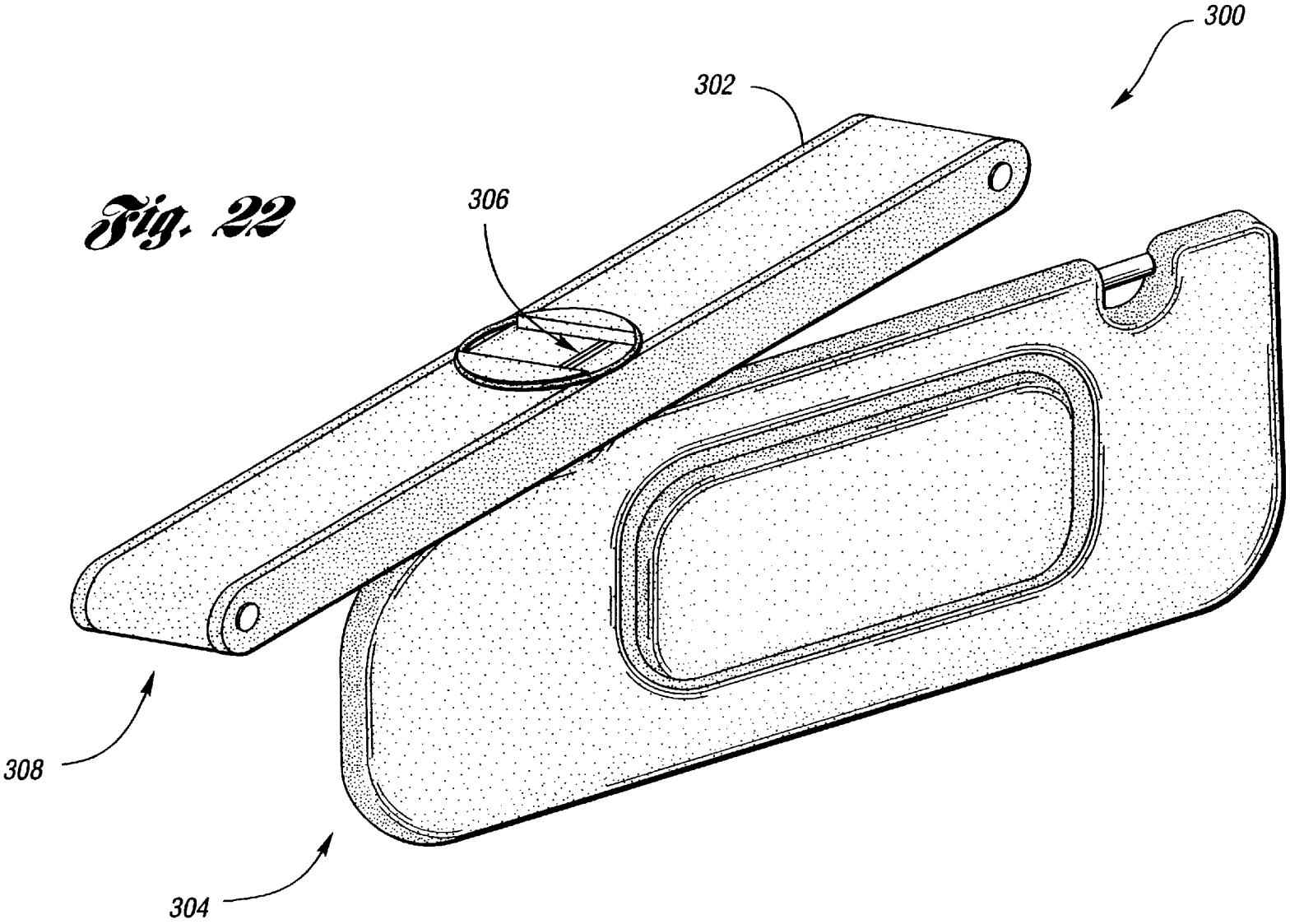
FIG. 22 is a perspective view of a third alternative embodiment of the invention which includes a slide track, a sun visor, an automatic pivot assembly and an automatic belt drive mechanism.

As shown in FIG. 20, the slide track 80 is provided with curved opposing ends 128,130 to facilitate the use of a conveyor belt type cover which would be engaged with the slide bracket 86 and looped fully around the outside of the slide track 80. As the slide bracket 86 is moved longitudinally along the slide track 80, the conveyor belt type cover would move with the slide bracket 86, and the curved ends 128,130 would provide smooth surfaces against which the cover could slide. In this manner, the cover would hide the screw 120 and other interior portions of the track assembly 116 from view during normal operation.

FIGS. 22 through 25 show a third alternative embodiment 300 of the sun visor assembly which is functionally similar to the sun visor assembly 200. The sun visor assembly 300 includes a slide track 302, a sun visor 304, an automatic pivot assembly 306 for pivoting the sun visor with respect to the slide track, and a belt drive mechanism 308 for automatically moving the sun visor along the slide track.

Figure 23:
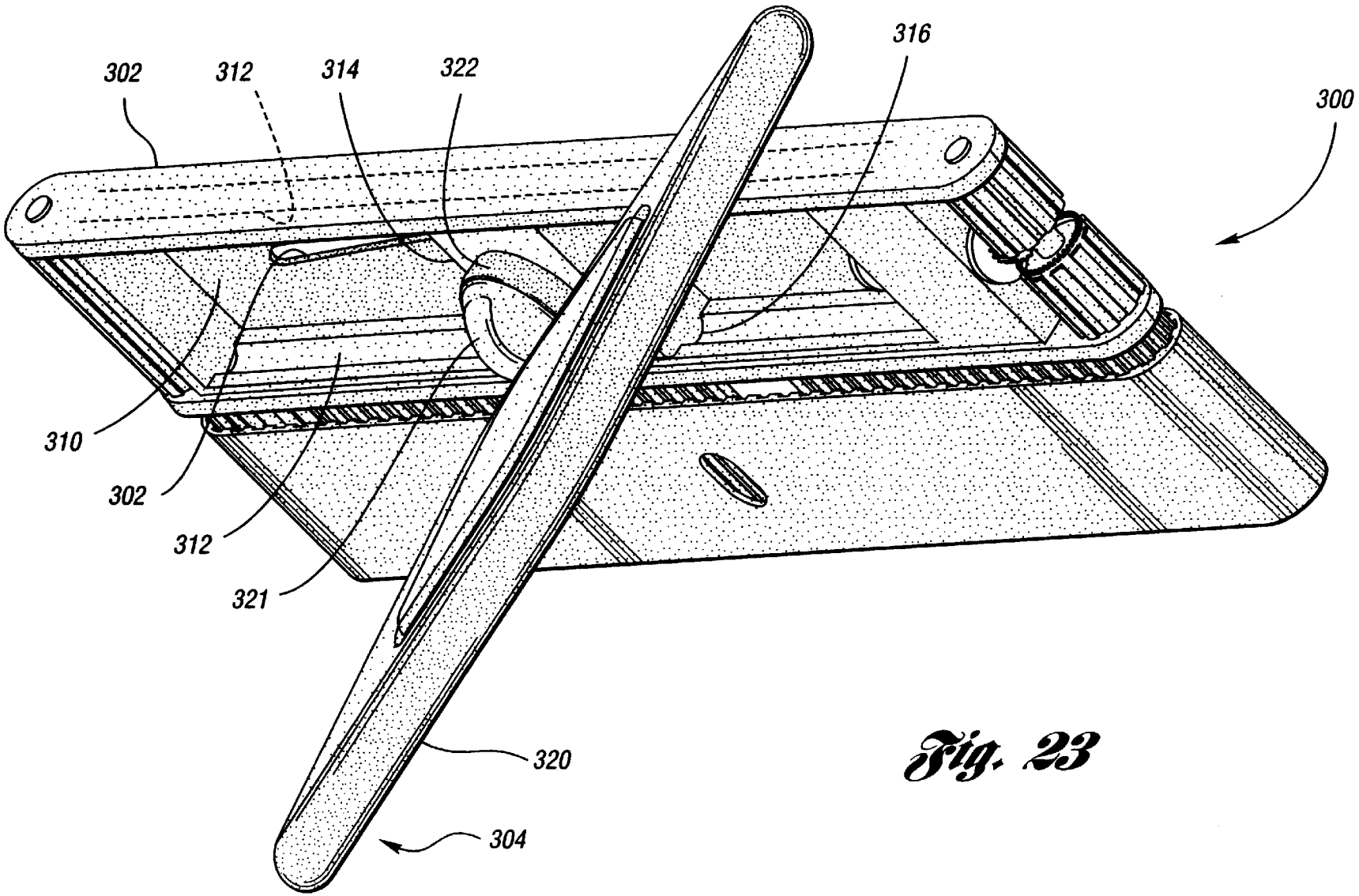
FIG. 23 is a bottom perspective view of the third alternative embodiment with a belt of the belt drive mechanism removed to show a slide bracket and slide track.
Figure 24:
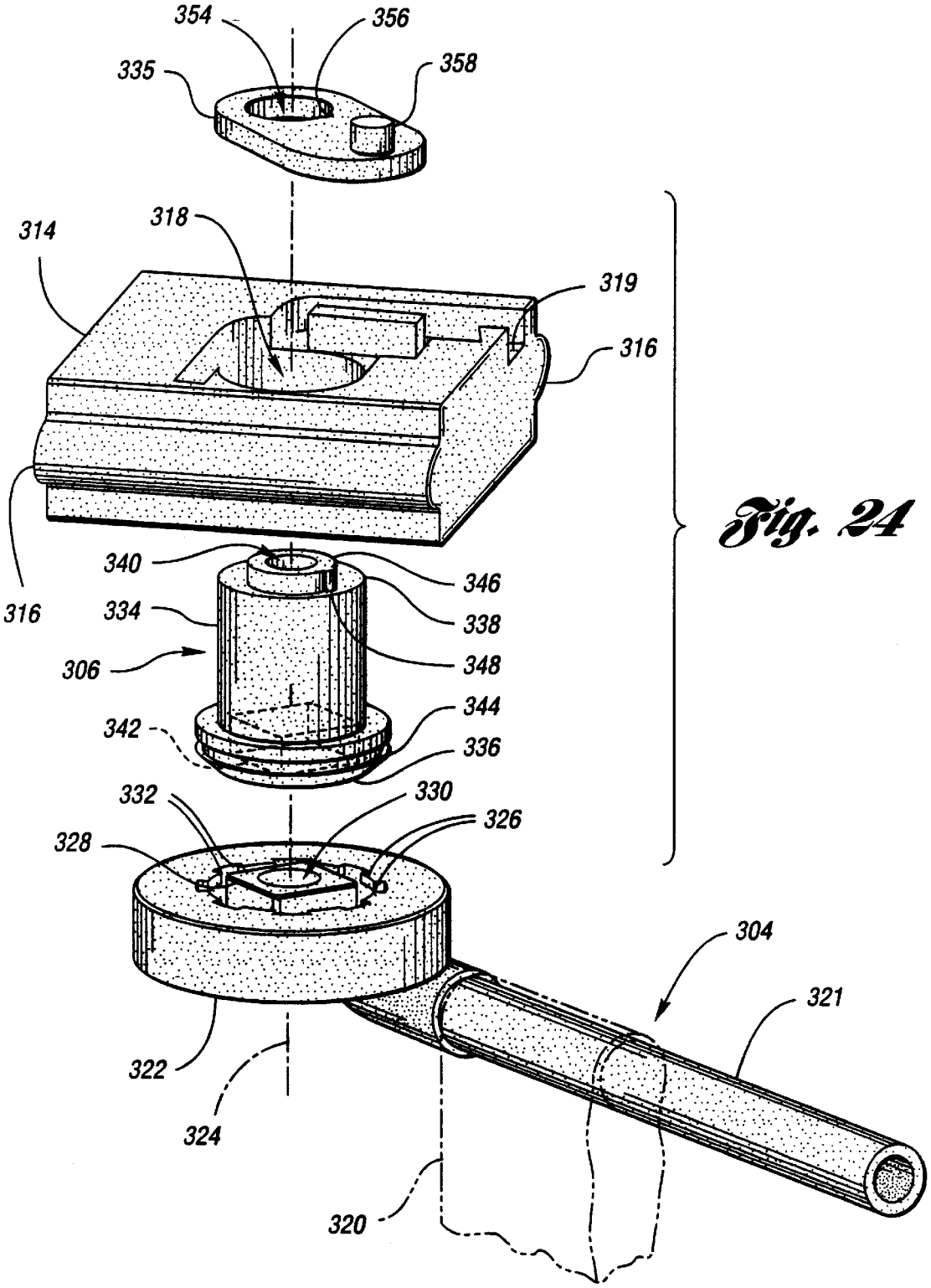
FIG. 24 is an exploded perspective view of the third alternative embodiment showing a sun visor mounting bracket, the slide bracket, and a cam member and a pivot shaft of the automatic pivot assembly.

The slide track 302 is attachable to the vehicle and has a channel 310 formed therein as shown in FIG. 23. Opposing grooves 312 preferably extend substantially the entire length of the slide track 302. A slide bracket 314 is slidably disposed within the channel 310 and has projections 316 on opposite sides, as shown in FIGS. 23 and 24, which slidably engage the grooves 312. The slide bracket 314 further has a generally cylindrical aperture 318 extending therethrough, and a slot 319 for optionally receiving electrical wires and/or an electrical connector (not shown) for providing electrical power to the sun visor 304.

As further shown in FIGS. 23 and 24, the sun visor 304 includes a visor body 320 supported by a support rod 321, which in turn is connected to a mounting bracket 322. The support rod 321 is pivotable about an axis 324 which intersects the slide bracket 314, and the rod is preferably hollow for optionally receiving electrical wires. The mounting bracket 322 has a generally circular recess 326, a preferably square-shaped boss 328 and a generally cylindrical aperture 330 extending therethrough for optionally receiving electrical wires from the support rod 321. A plurality of projections 332 extend radially into the recess 326.

The automatic pivot assembly 306 includes a pivot bracket or shaft 334 and a cam member 335, as shown in FIG. 24. The pivot shaft 334 is rotatably received within the slide bracket aperture 318, and has a generally cylindrical opening 340 extending therethrough for optionally receiving electrical wires from the mounting bracket aperture 330. A generally square shaped recess 342 is disposed at a one end of the pivot shaft, and the recess engages the mounting bracket boss 328 such that the pivot shaft is rotatable with the sun visor 304. The pivot shaft 334 further has a circumferential groove 344 which engages the mounting bracket projections 332 to provide a snap-fit connection between the pivot shaft and the mounting bracket 322. Alternatively, the pivot shaft 334 may be connected to the mounting bracket 322 in any suitable manner such that they are rotatable together. A generally cylindrical extension 346 is disposed at a second end of the pivot shaft 334, and the extension has a radially extending projection 348.

The cam member 335 has a generally circular aperture 354 which receives the cylindrical extension 346, and a slot 356 which engages the pivot shaft projection 348 such that the cam member is rotatable with the pivot shaft 334 and the sun visor 304. Alternatively, the cam member 335 and the pivot shaft 334 may be otherwise configured such that they are rotatable together. The cam member 335 further has a knob portion or projection 358 which is offset from the axis 324.

Figure 25:
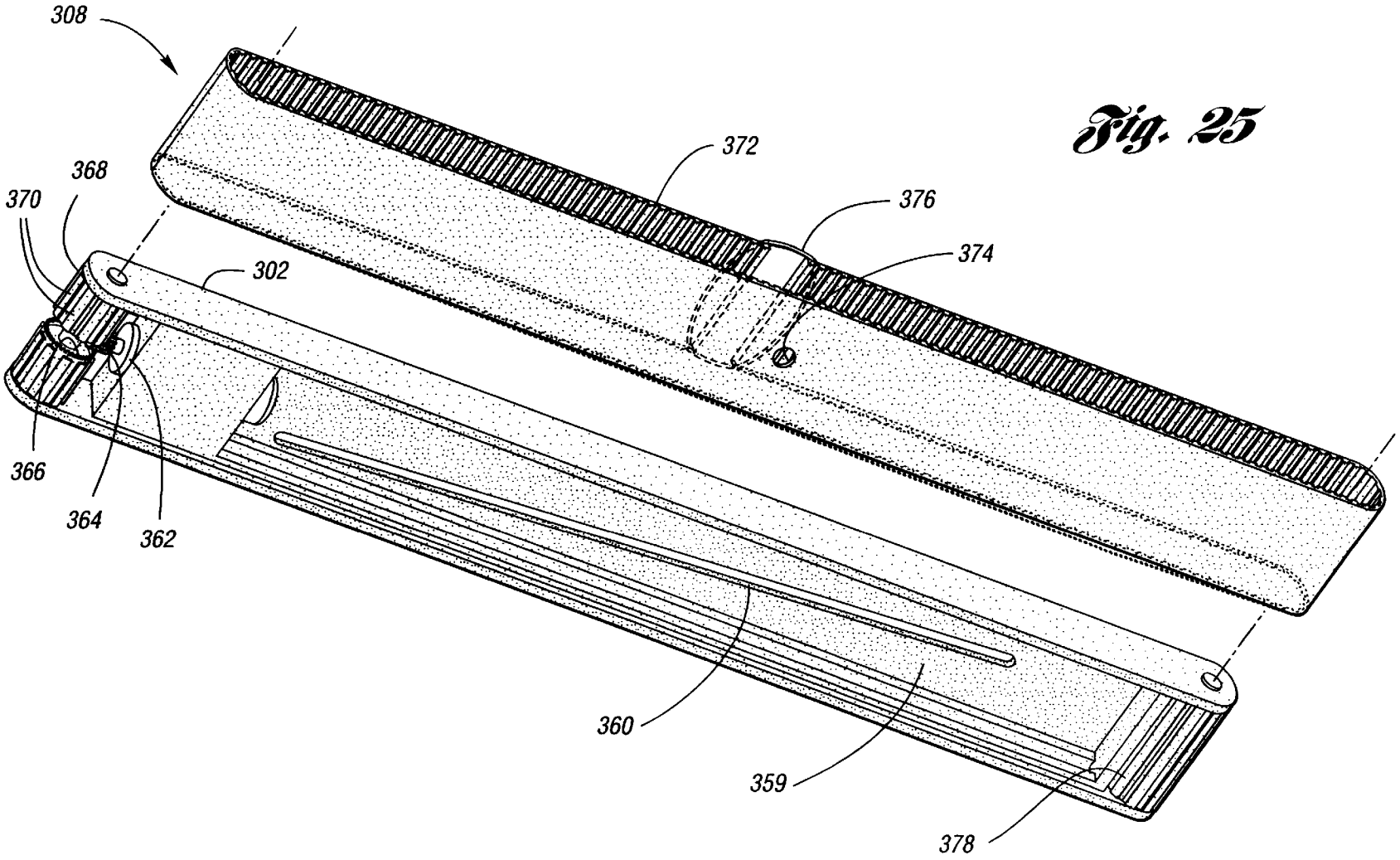
FIG. 25 is a bottom perspective view of the slide track and the belt drive mechanism of the third alternative embodiment, with the belt removed and positioned alongside of the slide track.

The automatic pivot assembly 306 further includes a cam track 359 as shown in FIG. 25. The cam track 359 has a cam slot 360 which is engageable with the cam member projection 358 for causing pivotal movement of the sun visor 304 in a manner similar to that described with respect to the second embodiment 200 of the sun visor assembly. The cam track 359 is preferably formed as part of the slide track 302, as shown in FIG. 25, but the cam track may be a separate component.

FIG. 25 also shows the belt drive mechanism 308, which includes an electric motor 362 disposed within the slide track 302. The motor 362 is connected by wiring to a control switch (not shown) which controls operation of the motor. The control switch may be mounted in the vehicle in any suitable location such as on an arm rest, door panel, floor console, roof console and/or steering wheel. The motor 362 has a drive gear 364 which rotatably engages and drives an internal spur gear 366 of a drive sprocket 368. The drive sprocket 368 is rotatably connected to one end of the slide track 302, and has a plurality of radially extending teeth or projections 370 which engage a continuous toothed belt 372. The belt 372 surrounds the slide track 302 and has an aperture 374 which engages the pivot shaft 334 for moving the pivot shaft and the slide bracket 314 along the slide track 302. The belt 372 also preferably includes a tensioning device such as an O-ring 376 for maintaining sufficient tension in the belt. Furthermore, the belt drive mechanism 308 also preferably includes an idler sprocket 378 to facilitate movement of the belt 372 about the slide track 302. Alternatively, the belt drive mechanism may have any suitable configuration sufficient to move the slide bracket 314 along the slide track 302.

When the motor 362 is activated, the belt 372 rotates about the slide track 302 and causes the slide bracket 314 to move along the slide track. As the slide bracket 314 is moved away from the front windshield, the sun visor 304 pivots toward the slide track 302 in a manner similar to that described with respect to the second embodiment 200 of the visor assembly. Conversely, as the slide bracket 314 is moved toward the front windshield, the sun visor 304 pivots away from the slide track 302. Advantageously, the belt drive mechanism 308 allows the sun visor 304 and the slide bracket 314 to be moved manually along the slide track 302 without disengaging the belt drive mechanism from the slide bracket 314.

Figure 26:
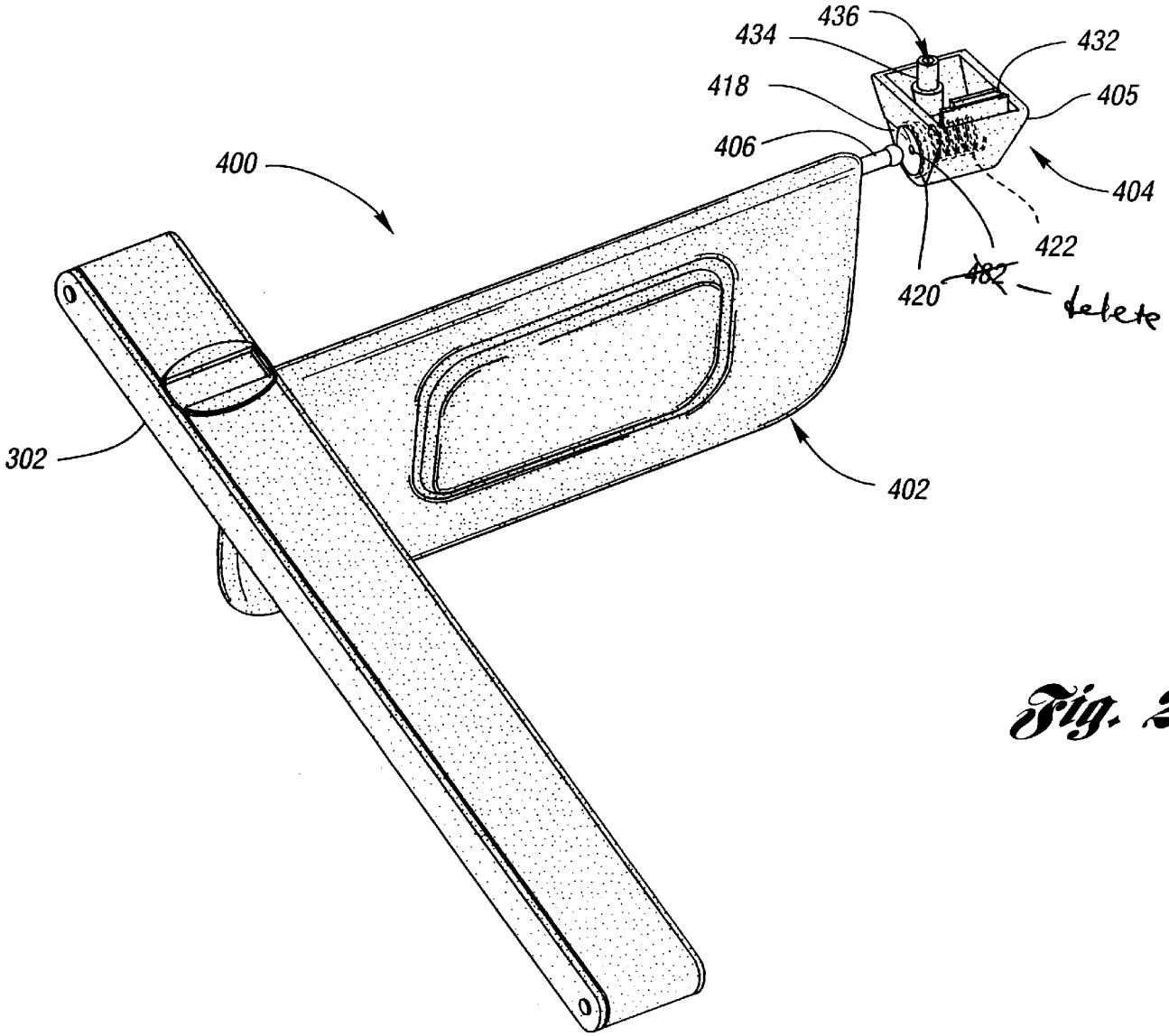
FIG. 26 is a top perspective view of a fourth alternative embodiment of the invention which includes a sun visor having a tip pin, and a visor check subassembly having a check body.
Figure 27:
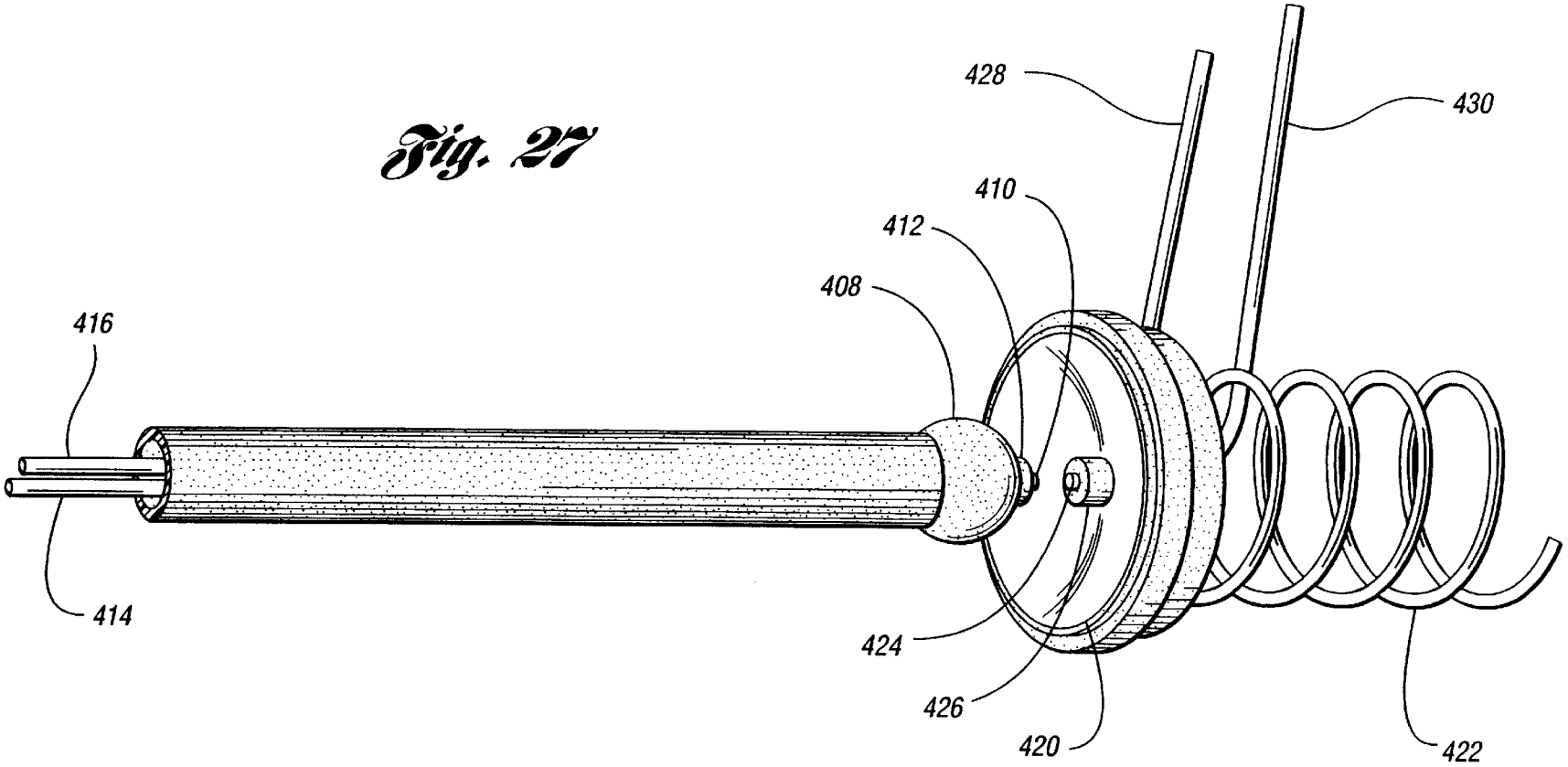
FIG. 27 is a perspective view of the tip pin and the visor check subassembly with the check body removed to show power leads connected to the visor check subassembly.

FIGS. 26 and 27 show a fourth alternative embodiment 400 of the sun visor assembly which includes a sun visor 402 and a visor check 404 for securing the sun visor 402 adjacent to the front windshield. The sun visor assembly 400 also has all of the other features of the sun visor assembly 300. The sun visor 402 includes a tip pin 406 having a conductive end 408 and a first electrical connector 410 which is insulated from the conductive end by an insulating member or ring 412. The conductive end 408 and the electrical connector 410 are connected by first and second electrical wires 414 and 416, respectively, to a sun visor vanity mirror or other component.

The visor check subassembly 404 includes a check body 405 having a recess 418, and a moveable, conductive engaging member or disk 420 which preferably has a concave shape. The conductive disk 420 is engageable with the conductive tip pin end 408, and is connected to a spring 422 for biasing the disk against the tip pin end. A second electrical connector 424 is preferably disposed at the center of the disk 420, and is insulated from the disk by an insulating member or ring 426. The electrical connector 424 is engageable with the electrical connector 410 when the tip pin end 408 is sufficiently seated on the disk 420. First and second power leads 428 and 430 are connected to the disk 420 and the electrical connector 424, respectively. The visor check subassembly 404 further has a hook 432 which is engageable with a corresponding aperture in the vehicle body sheet metal, and a boss 434. A preferably cylindrical aperture 436 extends through the boss 434 for receiving a sheet metal screw or other suitable fastener. Alternatively, the visor check subassembly 404 may be fastened to the vehicle body sheet metal and/or headliner in any suitable manner such that the visor check subassembly is disposed adjacent to the front windshield.

As the sun visor 402 is moved toward the front windshield, the sun visor pivots away from the slide track 302 as previously described. This pivotal movement of the sun visor 402 causes the tip pin end 408 to pivot through the recess 418 and to engage the disk 420, thereby depressing the disk against the spring 422. When the sun visor 402 is substantially parallel to the front windshield and the tip pin end 408 is seated on the disk 420, the spring 422 biases the disk against the tip pin end to sufficiently secure the sun visor 402 in place, while still permitting rotational movement of the tip pin 406 and sun visor relative to the disk. In this position, the conductive disk 420 engages the conductive end 408, and the electrical connectors 410 and 424 engage each other, thereby enabling electric power to be provided to the vanity mirror or other component.

Because the disk 420 preferably has a concave shape, and because the disk is biased by the spring 422, the visor check subassembly 404 is able to adjust to varying build and use conditions. Furthermore, the concave configuration of the disk 420 also functions to center the tip pin end 408 on the disk. As a result, the electrical connectors 410 and 424 are able to maintain contact with each other as the sun visor 402 is rotated with respect to the visor check subassembly 404. Alternatively, the visor check subassembly 404 and the tip pin 406 may have any suitable configuration such that they are engageable with each other to sufficiently secure the sun visor 402 adjacent to the front windshield, and to provide electric power to the sun visor 402. As another alternative, the visor check subassembly 404 and the tip pin 406 may be provided without any electrical connectors or conductive portions.

The invention has been described in an illustrative manner, and it is to be understood that the terminology which has been used is intended to be in the nature of words of description rather than of limitation. Obviously, many modifications and variations of the present invention are possible in light of the above teachings. For example, each of the sun visor assemblies according to the invention may be provided with an extended slide track so that the respective sun visor can provide side door window coverage for a rear seat occupant. Alternatively, one or more sun visor assemblies according to the invention may be installed in the rear portion of the vehicle for providing front windshield and/or side door window coverage for a rear seat occupant. Furthermore, each of the sun visor assemblies comprising an electric drive mechanism may be provided with a light tracking device which automatically controls the respective electric drive mechanism to properly adjust the respective sun visor in response to the relative position of the sun, or other light source, and the eyes of the target occupant. A sun visor assembly according to the invention having such a light tracking device may also be configured to automatically block direct sun load in an unattended vehicle parked outside, thereby reducing internal heat of the vehicle and/or ultraviolet ray bleaching of the upholstery and trim. It is, therefore, to be understood that within the scope of the appended claims, the invention may be practiced otherwise than as specifically described.

What is claimed is:

1. A sun visor assembly adapted for attachment in a vehicle having a front windshield and a side door window, the sun visor assembly comprising:

a slide track attachable to the vehicle above the side door window, said slide track having a channel formed therein;

a slide bracket slidably disposed within said channel;

a sun visor pivotably cooperating with said slide bracket, said sun visor being pivotable about an axis; and an automatic pivot assembly operatively connected between said sun visor and said slide track for automatically pivoting said sun visor toward a position in which said sun visor is substantially parallel with said slide track as said slide bracket is moved in a direction away from the front windshield, thereby preventing interference of said sun visor with a vehicle occupant as said sun visor is moved between the front windshield and the side door window.

2. The sun visor assembly of claim 1 wherein said slide track comprises a substantially straight configuration for attachment only above the side door window and not extending above the front windshield.

3. The sun visor assembly of claim 1 wherein said automatic pivot assembly comprises a cam member which cooperates with said sun visor for pivotal movement therewith, at least a portion of said cam member being offset from said axis; and a cam track having a cam slot engageable with said cam member for causing pivotal movement of said sun visor about said axis as said slide bracket is moved in a direction away from the front windshield.

4. The sun visor assembly of claim 3, wherein said cam track is formed integrally with said slide track.

5. The sun visor assembly of claim 3, wherein said slide track and said cam track are configured to allow unrestricted pivotal movement of said sun visor between positions substantially parallel and substantially perpendicular with said slide track when said slide bracket is positioned at an end of said slide track nearest the front windshield.

6. The sun visor assembly of claim 3 wherein said automatic pivot assembly further comprises a pivot shaft connected to said cam member and rotatably received within said slide bracket; and said sun visor further comprises a mounting bracket connected to said pivot shaft, and a support rod connected to said mounting bracket;

wherein said pivot shaft, said mounting bracket and said support rod are rotatable together about said axis.

7. The sun visor assembly of claim 6 wherein said cam member is keyed to said pivot shaft, and said pivot shaft is keyed to said mounting bracket.

8. The sun visor assembly of claim 6 wherein said pivot shaft has a circumferential groove and said mounting bracket has at least one projection which engages said groove.

9. The sun visor assembly of claim 1 further comprising:

a motor, and a drive mechanism engaging said motor and cooperable with said slide bracket for sliding said slide bracket along said slide track.

10. The sun visor assembly of claim 9 wherein said drive mechanism comprises a drive screw engaged with said slide bracket for actuating movement of said slide bracket along said slide track.

11. The sun visor assembly of claim 9 wherein said drive mechanism comprises a toothed drive sprocket engaged with said motor and a toothed continuous belt engaged with said drive sprocket, said belt engaging said automatic pivot assembly for sliding said slide bracket along said track.

12. The sun visor assembly of claim 11 wherein said belt includes a tensioning device for maintaining sufficient tension in said belt.

13. A sun visor assembly adapted for attachment in a vehicle having a front windshield and a side door window, the sun visor assembly comprising:

a slide track attachable to the vehicle above the side door window, said slide track having a channel formed therein;

a slide bracket slidably disposed within said channel;

a sun visor pivotably cooperating with said slide bracket, and pivotable about an axis of rotation intersecting said slide bracket;

a cam member cooperating with said sun visor for rotation therewith, at least a portion of said cam member being offset from said axis; and a cam track engageable with said cam member for causing rotation of said sun visor about said axis toward a position in which said sun visor is substantially parallel with said slide track as said slide bracket is moved in a direction away from the front windshield, thereby preventing interference of said sun visor with the head of a vehicle occupant as said sun visor is moved between the front windshield and the side door window.

14. The sun visor assembly of claim 13 further comprising a pivot shaft connected to said cam member and rotatably received within said slide bracket; and said sun visor further comprises a mounting bracket connected to said pivot shaft, and a support rod connected to said mounting bracket;

wherein said pivot shaft, said mounting bracket and said support rod are rotatable together about said axis.

15. The sun visor assembly of claim 13 wherein said cam track is formed integrally with said slide track.

16. The sun visor assembly of claim 13 wherein said slide track and said cam track are configured to allow unrestricted pivotal movement of said sun visor between positions substantially parallel and substantially perpendicular with said slide track when said slide bracket is positioned at an end of said slide track nearest the front windshield.

17. The sun visor assembly of claim 13 wherein said slide track comprises a substantially straight configuration for attachment only above the side door window and not extending above the front windshield.

18. The sun visor assembly of claim 13 further comprising first and second mating electrical connectors attached to said slide bracket and said slide track, respectively, for providing electric current to said sun visor.

19. The sun visor assembly of claim 13 further comprising:

a visor check for securing said sun visor adjacent to the front windshield, and first and second mating electrical connectors attached to said sun visor and said visor check, respectively, for selectively providing electric current to said sun visor.

20. The sun visor assembly of claim 19 wherein said sun visor includes a tip pin, and said visor check includes a movable engaging member engageable with said tip pin, wherein said first electrical connector is disposed on said tip pin and said second electrical connector is disposed on said movable engaging member..

21. The sun visor assembly of claim 20 wherein said visor check further includes a spring connected to said engaging member for biasing said engaging member against said tip pin.

22. The sun visor assembly of claim 13 further comprising:

a visor check having a movable engaging member engageable with said sun visor for securing said sun visor adjacent to the front windshield.

23. The sun visor assembly of claim 22 wherein said sun visor includes a tip pin engageable with said engaging member, and said visor check includes a spring connected to said engaging member for biasing said engaging member against said tip pin.

24. A sun visor assembly adapted for attachment in a vehicle having a front windshield and a side door window, the sun visor assembly comprising:

a slide track attachable to the vehicle above the side door window, said slide track having a cam slot and a channel formed therein;

a slide bracket slidably disposed within said channel;

a sun visor pivotably cooperating with said slide bracket, said sun visor being pivotable about an axis which intersects said slide bracket;

a cam member cooperating with said sun visor for pivotal movement therewith, said cam member having a projection, said projection being offset from said axis and being engageable with said cam slot;

a motor disposed within said slide track;

a drive sprocket rotatably connected to said slide track and driveably engaged with said motor; and a continuous belt surrounding said slide track and driveably engaged with said drive sprocket, said belt being cooperable with said slide bracket for sliding said slide bracket along said slide track;

wherein when said slide bracket slides along said slide track in a direction away from the front windshield, said cam member projection engages said cam slot for causing rotation of said sun visor about said axis toward a position in which said sun visor is substantially parallel with said slide track, thereby preventing interference of said sun visor with a vehicle occupant as said sun visor is moved between the front windshield and side door window.

* * * * *